US009548493B2

(12) United States Patent
Yoo et al.

(10) Patent No.: US 9,548,493 B2
(45) Date of Patent: Jan. 17, 2017

(54) POROUS COMPOSITE AND MANUFACTURING METHOD THEREOF

(71) Applicant: LG Chem, Ltd., Seoul (KR)

(72) Inventors: Jung Woo Yoo, Daejeon (KR); Yong Ju Lee, Daejeon (KR); Yoon Ah Kang, Daejeon (KR); Mi Rim Lee, Daejeon (KR); Je Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 92 days.

(21) Appl. No.: 14/164,356

(22) Filed: Jan. 27, 2014

(65) Prior Publication Data

US 2014/0141334 A1 May 22, 2014

Related U.S. Application Data

(63) Continuation of application No. PCT/KR2013/009749, filed on Oct. 30, 2013.

(30) Foreign Application Priority Data

Oct. 31, 2012 (KR) .................... 10-2012-0122376
Oct. 29, 2013 (KR) .................... 10-2013-0129620

(51) Int. Cl.
 *H01M 4/36* (2006.01)
 *H01M 4/48* (2010.01)
 (Continued)

(52) U.S. Cl.
 CPC ............ *H01M 4/483* (2013.01); *C01G 1/02* (2013.01); *H01M 4/364* (2013.01); *H01M 4/366* (2013.01);
 (Continued)

(58) Field of Classification Search
 CPC .... C01G 1/02; C01P 2006/12; C01P 2006/16; C01P 2006/40; C01P 2004/03; C01P 2002/60; H01M 4/483; H01M 4/485; H01M 10/052
 See application file for complete search history.

(56) References Cited

U.S. PATENT DOCUMENTS 8,574,942 B2  11/2013 Park et al.
2010/0243951 A1  9/2010 Watanabe et al.
(Continued)

FOREIGN PATENT DOCUMENTS

JP   H09143690 A   6/1997
JP   2005-310759 A  11/2005
(Continued)

OTHER PUBLICATIONS

English translation of KR 10-1114492, Feb. 2012.*

*Primary Examiner* — Brittany Raymond
(74) *Attorney, Agent, or Firm* — Lerner, David, Littenberg, Krumholz & Mentlik, LLP

(57) ABSTRACT

Provided are a porous composite expressed by Chemical Formula 1 and having a porosity of 5% to 90%, and a method of preparing the same:

$MO_x$ <Chemical Formula 1> where M and x are the same as described in the specification.

According to the present invention, since a molar ratio (x) of oxygen to a molar ratio of (semi) metal in the porous composite is controlled, an initial efficiency of a secondary battery may be increased. Also, since the porous composite satisfies the above porosity, a thickness change rate of an electrode generated during charge and discharge of the secondary battery may be decreased and lifetime characteristics may be improved.

13 Claims, 1 Drawing Sheet

(51) Int. Cl.
  *C01G 1/02* (2006.01)
  *H01M 4/38* (2006.01)
  H01M 10/052 (2010.01)
  H01M 4/13 (2010.01)
  H01M 4/62 (2006.01)
  H01M 4/485 (2010.01)

(52) U.S. Cl.
  CPC .......... *H01M 4/386* (2013.01); *C01P 2002/60* (2013.01); *C01P 2004/03* (2013.01); *C01P 2006/12* (2013.01); *C01P 2006/16* (2013.01); *C01P 2006/40* (2013.01); *H01M 4/13* (2013.01); *H01M 4/485* (2013.01); *H01M 4/625* (2013.01); *H01M 10/052* (2013.01)

(56) References Cited

U.S. PATENT DOCUMENTS

| | | |
|---|---|---|
| 2013/0224599 A1 | 8/2013 | Park et al. |
| 2013/0280612 A1 | 10/2013 | Lee et al. |
| 2014/0030602 A1 | 1/2014 | Park et al. |

FOREIGN PATENT DOCUMENTS

| | | |
|---|---|---|
| JP | 2013225470 A | 10/2013 |
| KR | 20070109634 A | 11/2007 |
| KR | 10-1114492 * | 2/2012 |
| KR | 10-1114492 B1 | 2/2012 |
| KR | 2012-0035079 A | 4/2012 |
| KR | 10-1195546 B1 | 10/2012 |
| WO | 2007/133005 A1 | 11/2007 |

\* cited by examiner

POROUS COMPOSITE AND MANUFACTURING METHOD THEREOF

CROSS-REFERENCE TO RELATED APPLICATIONS

The present application is a continuation of International Application No. PCT/KR2013/009749 filed on Oct. 30, 2013, which claims the benefit of Korean Patent Application No. 10-2013-0129620, filed on Oct. 29, 2013 and Korean Patent Application No. 10-2012-0122376, filed on Oct. 31, 2012, the disclosures of which are incorporated herein by reference.

TECHNICAL FIELD

The present invention relates to a porous composite and a manufacturing method thereof, and more particularly, to a porous composite expressed by $MO_x$ (where $0.5<x<1$) and having a porosity of 5% to 90%, and a manufacturing method thereof.

BACKGROUND ART

Recently, lithium secondary batteries have received the most attention due to their characteristics of high energy density and long lifetime. In general, a lithium secondary battery includes an anode formed of a carbon material or a lithium metal alloy, a cathode formed of lithium metal oxide, and an electrolyte in which a lithium salt is dissolved in an organic solvent.

Lithium has been initially used as an anode active material constituting the anode of the lithium secondary battery. However, since lithium may have low reversibility and safety, a carbon material has currently been mainly used as the anode active material of the lithium secondary battery. Although the carbon material may have a lower capacity than lithium, the carbon material may have smaller volume changes as well as excellent reversibility and may also be advantageous in terms of cost.

Recently, the demand for high-capacity lithium secondary batteries has gradually increased as the use of the lithium secondary battery has expanded. As a result, a high-capacity electrode active material replaceable with a low-capacity carbon material has been required. For this, research into using a (semi) metal, such as silicon (Si) and tin (Sn), which exhibits a higher charge and discharge capacity than a carbon material and is electrochemically alloyable with lithium, as an electrode active material has been undertaken.

In a case where the (semi) metal electrochemically alloyable with lithium, such as silicon, is used, cracks or fine particles may be generated due to the changes in volume caused by repeated charge and discharge of a battery, and thus, the battery may degrade. As a result, capacity of the battery may decrease. Also, there has been a case in which oxide of the (semi) metal was typically used as an electrode active material in order to reduce the cracks or fine particles due to the changes in volume. However, in this case, since lithium oxide or lithium metal oxide, as an irreversible phase caused by an initial reaction with lithium ions, is formed, an initial efficiency of the battery may decrease.

DISCLOSURE OF THE INVENTION

Technical Problem

The present invention provides a porous composite, in which an initial efficiency may be improved by controlling a molar ratio of oxygen combined with (semi) metal, and lifetime characteristics may be improved and a thickness change rate during charge and discharge may be decreased by including a plurality of pores on a surface or the surface and inside of the porous composite, and a method of preparing the same.

Technical Solution

According to an aspect of the present invention, there is provided a porous composite expressed by Chemical Formula 1 and having a porosity of 5% to 90%:

$$MO_x \qquad \text{<Chemical Formula 1>}$$

where M is at least one element selected from the group consisting of silicon (Si), tin (Sn), aluminum (Al), antimony (Sb), bismuth (Bi), arsenic (As), germanium (Ge), lead (Pb), zinc (Zn), cadmium (Cd), indium (In), titanium (Ti), and gallium (Ga), and $0.5<x<1$.

According to another aspect of the present invention, there is provided a method of preparing a porous composite including mechanical alloying after mixing (semi) metal particles and (semi) metal oxide particles; contacting the alloyed mixed particles with the electrodeposit solution made by mixing of a fluorinated solution and a metal precursor solution to electrodeposit metal particles on the surface of the mixed particles; etching the mixed particles having the metal particles electrodeposited thereon by contacting the mixed particles with an etching solution; and contacting the etched mixed particles with a metal removing solution to remove the electrodeposited metal particles.

According to another aspect of the present invention, there is provided an anode active material including the porous composite.

According to another aspect of the present invention, there is provided an anode including the anode active material.

According to another aspect of the present invention, there is provided a lithium secondary battery including the anode.

Advantageous Effects

According to the present invention, since a molar ratio (x) of oxygen to a molar ratio of (semi) metal in a porous composite expressed by Chemical Formula 1 may be controlled to be greater than 0.5 and less than 1 by using mechanical alloying, an initial efficiency of a secondary battery may be increased. Also, since the porous composite includes a plurality of pores on a surface or the surface and inside thereof and satisfies the above-described porosity, a thickness change rate of an electrode generated during charge and discharge of the secondary battery may be decreased and lifetime characteristics may be improved.

MODE FOR CARRYING OUT THE INVENTION

Figure 1:
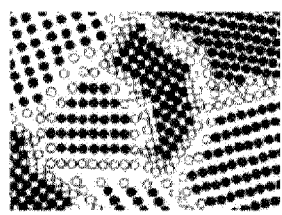
FIG. 1 is a schematic view illustrating a porous composite according to an embodiment of the present invention (black parts: (semi) metal, white parts: (semi) metal oxide)

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A porous composite according to an embodiment of the present invention may be expressed by the following Chemical Formula 1 and may have a porosity of 5% to 90%.

$$MO_x \qquad \text{<Chemical Formula 1>}$$

where M is at least one element selected from the group consisting of silicon (Si), tin (Sn), aluminum (Al), antimony (Sb), bismuth (Bi), arsenic (As), germanium (Ge), lead (Pb), zinc (Zn), cadmium (Cd), indium (In), titanium (Ti), and gallium (Ga), and $0.5<x<1$.

A porosity of the porous composite according to the embodiment of the present invention is in a range of 5% to 90%, may be in a range of 20% to 80%, and for example, may be in a range of 30% to 70%.

In the case that the porosity of the porous composite is less than 5%, volume expansion during charge and discharge may not be prevented. In the case in which the porosity of the porous composite is greater than 90%, mechanical strength may be decreased due to a plurality of pores included in the porous composite, and thus, the porous composite may be fractured during manufacturing processes (slurry mixing, pressing after coating, etc.) of a battery.

Herein, the porosity may be defined as follows:

Porosity=volume of pores per unit mass/(specific volume+volume of pores per unit mass)

The measurement of the porosity is not particularly limited. According to an embodiment of the present invention, the porosity, for example, may be measured by a Brunauer-Emmett-Teller (BET) method or mercury (Hg) porosimetry.

Also, a BET specific surface area of the porous composite may be in a range of 2 $m^2/g$ to 100 $m^2/g$.

In the case that the specific surface area is greater than 100 $m^2/g$, a side reaction with an electrolyte solution may be difficult to be controlled due to the wide specific surface area. In the case in which the specific surface area is less than 2 $m^2/g$, sufficient pores may not be formed, and thus, the volume expansion during the charge and discharge of a lithium secondary battery may not be effectively accommodated.

The specific surface area of the porous composite may be measured by a BET method. For example, the specific surface area may be measured by a 6-point BET method according to a nitrogen gas adsorption-flow method using a porosimetry analyzer (Belsorp-II mini by Bell Japan Inc.).

With respect to the porous composite according to the embodiment of the present invention, pores may be formed on a surface or the surface and inside of the composite.

A diameter of the pore on the surface of the porous composite may be in a range of 10 nm to 1,000 nm. In the case that the diameter of the pore is less than 10 nm, pores may be clogged due to the volume expansion caused by the charge and discharge. In the case in which the diameter of the pore is greater than 1,000 nm, cracks may occur around the pores in the porous composite due to the pores having a size relatively larger than a diameter of the porous composite. As described above, since the porous composite according to the embodiment of the present invention may include the plurality of pores on the surface or the surface and inside of the composite and may satisfy the above porosity, the thickness change rate of the electrode generated during the charge and discharge of the secondary battery may be decreased and the lifetime characteristics may be improved.

Also, the porous composite according to the embodiment of the present invention may include (semi) metal particles and oxide particles of (semi) metal.

In particular, since a molar ratio of oxygen to a molar ratio of (semi) metal in the porous composite, i.e., x in Chemical Formula 1, may be controlled to be greater than 0.5 and less than 1, for example, in a range of 0.6 to 0.9, an initial efficiency of the secondary battery may be increased.

The molar ratio (x) of oxygen may be measured by an amount of oxygen that is included in a gas generated by heating the porous composite and may be measured with a commercial oxygen analyzer. In the case that the molar ratio is 0.5 or less, the initial efficiency may be high but the amount of oxygen that may inhibit the volume expansion may be low, and thus, the lifetime and the inhibition of thickness expansion may be reduced even if a porous structure is formed. In the case in which the molar ratio is 1 or more, the amount of oxygen may increase, and thus, the initial efficiency may decrease.

Specifically, the porous composite according to the embodiment of the present invention may have a structure in which the (semi) metal particles are surrounded by the (semi) metal oxide particles. Therefore, it may be estimated that the volume change of the (semi) metal particles during the charge and discharge of the secondary battery may be inhibited by the (semi) metal oxide particles.

The (semi) metal is not particularly limited so long as it is a metal or semimetal that is alloyable with lithium. Non-limiting examples of the (semi) metal may be a semimetal or metal selected from the group consisting of Si, Sn, Al, Sb, Bi, As, Ge, Pb, Zn, Cd, In, Ti, Ga, and an alloy thereof.

The (semi) metal oxide is a metal oxide or oxide of semimetal and is not particularly limited so long as it is an oxide of the metal or semimetal that is alloyable with lithium. Non-limiting examples of the (semi) metal oxide may be an oxide of the semimetal or metal selected from the group consisting of Si, Sn, Al, Sb, Bi, As, Ge, Pb, Zn, Cd, In, Ti, Ga, and an alloy thereof.

In the porous composite according to the embodiment of the present invention, the (semi) metal particles may be Si, the (semi) metal oxide particles may be $SiO_2$, and M in Chemical Formula 1 may be Si. Since the amount of $SiO_2$ may decrease and the amount of oxygen that may be combined with Si may decrease as the amount of Si increases, the porous composite may be expressed by $SiO_x$ (where $0.5<x<1$). Also, the (semi) metal particles and the (semi) metal oxide particles in the porous composite may be in the form of nanocrystals. A diameter of the nanocrystals may be in a range of 0.1 nm to 100 nm.

The porous composite is formed by mixing the (semi) metal particles and the (semi) metal oxide particles by mechanical alloying, and in this case, a molar ratio of the (semi) metal to the (semi) metal oxide may be in a range of 80:20 to 50:50. However, the present invention is not limited thereto. In the case that the molar ratio is less than the above range, since reversible capacity may be low, an effect as a high-capacity electrode active material may be insignificant. Also, since an amount of lithium oxide or lithium metal oxide formed as an irreversible phase due to an initial reaction with lithium ions may be excessively high, the initial efficiency may decrease. In contrast, in the case in which the molar ratio is greater than the above range, since volume changes of the (semi) metal generated during the charge and discharge of the battery may not be sufficiently inhibited, cracks or fine particles of the electrode active material may occur. Thus, the capacity and lifetime of the battery may be reduced.

Also, with respect to the porous composite, the molar ratio (x) of oxygen to the molar ratio of the (semi) metal in the porous composite may be controlled to be greater than 0.5 and less than 1 by mechanical alloying. Therefore, since a reaction of lithium and the (semi) metal oxide or a reaction of lithium and oxygen may decrease during the charge and discharge of the battery when the porous composite is used as an electrode active material, the amount of the formed lithium oxide or lithium metal oxide, i.e., the irreversible phase, may decrease. Thus, the initial efficiency of the battery may be improved. In addition, volume changes of the electrode active material generated during the charge and discharge of the battery may be inhibited.

Furthermore, since the volume changes of the (semi) metal particles may be inhibited or minimized by the (semi) metal oxide particles, the volume changes of the electrode active material may be inhibited or minimized during the charge and discharge of the battery. Thus, a secondary battery using the porous composite according to the embodiment of the present invention may have a lower volume change rate based on an initial value than a typical secondary battery using a (semi) metal alloyable with lithium. According to an embodiment of the present invention, the typical secondary battery using the (semi) metal alloyable with lithium may have a volume change of theoretically 400%, substantially about 700% to about 800%. In contrast, the volume change rate based on the initial value of the secondary battery using the porous composite according to the embodiment of the present invention may be about 100%.

The porous composite according to the embodiment of the present invention may further include a carbon coating layer on the porous composite in order to improve a battery performance of the secondary battery.

The carbon coating layer may be formed by a heat treatment method after pitch or a hydrocarbon-based material is mixed, or a chemical vapor deposition (CVD) method.

In addition, the porous composite may be used by being mixed with an additional carbon material, and specifically, the carbon material may include natural graphite, artificial graphite, or mesocarbon microbeads (MCMB).

Also, the present invention may provide a method of preparing a porous composite including mechanical alloying after mixing (semi) metal particles and (semi) metal oxide particles, contacting the alloyed mixed particles with the electrodeposit solution made by mixing of a fluorinated solution and a metal precursor solution to electrodeposit metal particles on the surface of the mixed particles, etching the mixed particles having the metal particles electrodeposited thereon by contacting the mixed particles with an etching solution, and contacting the etched mixed particles with a metal removing solution to remove the electrodeposited metal particles.

The method of preparing a porous composite according to an embodiment of the present invention may include mechanical alloying after mixing (semi) metal particles and (semi) metal oxide particles.

Herein, the expression "mechanical alloying" is referred to as making a mixed composite having a uniform composition by applying a mechanical force. The mechanical alloying may be performed by using a mechano-fusion apparatus that is known in the art. Examples of the mechano-fusion apparatus may be a high-energy ball mill, a planetary ball mill, a stirred ball mill, or a vibrating mill. Among the above apparatuses, the mechanical alloying may be performed with the high-energy ball mill. However, the present invention is not limited thereto. For example, (semi) metal having an average particle diameter of about 2 μm to about 10 μm, for example, about 2 μm to about 5 μm and (semi) metal oxide having an average particle diameter of about 2 μm to about 10 μm, for example, about 2 μm to about 5 μm are mixed and the mixture is put in a mechano-fusion apparatus, such as a ball mill, with balls having a diameter of about 5 mm. Then, mechanical alloying is performed at a rotational speed of about 300 rpm to about 3,000 rpm at room temperature.

As a result, the mixture of the (semi) metal (black parts) and the (semi) metal oxide (white parts) are ground due to high-energy ball milling to become fine powder, and thus, the mixture may be uniformly mixed and simultaneously, a mixed composite may be formed (see FIG. 1).

However, in order to more efficiently control the molar ratio (x) of oxygen to the molar ratio of the (semi) metal in the mixed composite formed by the preparing method according to the embodiment of the present invention to be greater than 0.5 and less than 1, the mixing and mechanical alloying of the (semi) metal particles and the (semi) metal oxide particles may be performed in an atmosphere in which any contact with oxygen is avoided. For example, the mixing and mechanical alloying may be performed in an inert atmosphere including nitrogen gas, argon gas, helium gas, krypton gas, or xenon gas, a hydrogen gas atmosphere, or a vacuum atmosphere.

In this case, the average particle diameters of the (semi) metal particles and the (semi) metal oxide particles are not particularly limited. However, small diameters may be used to reduce mixing time and mechanical alloying treatment time.

Also, a weight ratio of the mixture of the (semi) metal particles and the (semi) metal oxide particles to the balls may be in a range of 1:10 to 1:20. In the case that the weight ratio is out of the above range, compressive stress may not be transferred to the mixture, or since a more than necessary amount of balls are used, it may be inefficient in terms of energy efficiency.

A stainless ball or zirconia ball having a diameter of 0.1 mm to 10 mm may be used as the ball.

A method of preparing a porous composite according to an embodiment of the present invention may include contacting the alloyed mixed particles with the electrodeposit solution made by mixing of a fluorinated solution and a metal precursor solution to electrodeposit metal particles on the surface of the mixed particles.

In this case, the mixed particles emit electrons due to the fluorinated solution and metal ions in the solution receive electrons to be reduced and electrodeposited on the surfaces of the mixed particles. Once the metal particles are electrodeposited on the surfaces of the mixed particles, continuous electrodeposition may occur as the metal particle itself becomes a catalyst site.

The fluorinated solution used may be one or more selected from the group consisting of hydrogen fluoride (HF), silicon fluoride ($H_2SiF_6$), and ammonium fluoride ($NH_4F$), and the metal precursor solution may include one or more selected from the group consisting of silver (Ag), gold (Au), platinum (Pt), and copper (Cu). The fluorinated solution and the metal precursor solution may be mixed at a volume ratio ranging from 10:90 to 90:10. In the case that the volume ratio of the fluorinated solution included is less than 10, an amount of the metal precursor formed on the surfaces of the mixed particles may be small and a reaction rate may be very slow, and thus, a preparation time may increase. In the case in which the volume ratio of the fluorinated solution included is greater than 90, formation speed of the metal precursor may be very fast, and thus, uniform and small-sized metal particles may not be electrodeposited on the surfaces of the mixed particles.

Also, an amount of the metal particles electrodeposited on the mixed particles may be controlled according to a concentration of the fluorinated solution and a contact time of the mixed particles with the metal precursor solution. An amount of the contacted mixed particles may be in a range of 0.001 parts by weight to 50 parts by weight based on 100 parts by weight of a mixed solution of the fluorinated solution and the metal precursor solution.

The method of preparing a porous composite according to the embodiment of the present invention includes etching the mixed particles having metal particles electrodeposited thereon by contacting the mixed particles with an etching solution. Nanopores, mesopores, and macropores are formed in the mixed particles through the etching process.

The metal precursor ionized in a HF solution is reduced in the form of metal particles and electrodeposited on the surfaces of the mixed particles, the mixed particles are continuously dissolved while transferring electrons to the metal particles, and simultaneously, the reduction of metal ions occurs in the electrodeposited metal particles. According to the foregoing method, the mixed particles in contact with the metal particles may be continuously etched to form a porous structure having a honeycomb shape at least on the surface thereof.

A mixed solution of HF solution and ethanol ($C_2H_5OH$) may be used as the etching solution, and in some cases, hydrogen peroxide ($H_2O_2$) may be added. An amount of the HF solution may vary according to a degree of etching. However, the HF solution and the $C_2H_2OH$ solution may be mixed at a volume ratio ranging from 10:90 to 90:10, and the $H_2O_2$ solution may be mixed at a volume ratio of 10 to 90 based on the mixed solution of the HF solution and the $C_2H_5OH$ solution. At this time, $H_2O_2$ may act as a catalyst and may control the amount of the electrodeposited metal particles or the degree of etching according to the concentration thereof.

Also, the etching may be performed for 30 minutes to 12 hours. In the case that the etching is performed less than 30 minutes, the formation of pores in the mixed particles may be insignificant. In the case in which the etching is performed greater than 12 hours, the mixed particles are excessively etched, and thus, mechanical properties of the mixed particles may be deteriorated.

The method of preparing a porous composite according to the embodiment of the present invention includes removing the electrodeposited metal particles by contacting the etched mixed particles with a metal removing solution, and may prepare particles, in which pores in a honeycomb shape are formed at least on the surfaces of the mixed particles.

The metal removing solution used may be one or more selected from the group consisting of nitric acid ($HNO_3$), sulfuric acid ($H_2SO_4$), and hydrochloric acid (HCl).

In the method of preparing a porous composite according to the embodiment of the present invention, the etching method after the mechanical alloying may form pores without changing the crystal structure of the mixed composite.

Furthermore, the method of preparing a porous composite according to the embodiment of the present invention may further include mixing the porous composite with a carbon precursor after removing the electrodeposited metal particles and then heat treating the mixture to coat the surface of the porous composite with carbon.

Any carbon precursor may be used without limitation so long as it may form carbon by a heat treatment, and for example, graphite, pitch or a hydrocarbon-based material may be used. Examples of the hydrocarbon-based material may be any one selected from the group consisting of furfuryl alcohol, glucose, sucrose, a phenol-based resin, a phenol-based oligomer, a resorcinol-based resin, a resorcinol-based oligomer, a phloroglucinol-based resin, a phloroglucinol-based oligomer, and an unsaturated hydrocarbon gas, such as ethylene, propylene, or acetylene, or a mixture of two or more thereof.

According to an embodiment of the present invention, the carbon precursor may be used in an amount ranging from 1 wt % to 30 wt % based on a total weight of the porous composite.

In the case that the amount of the carbon precursor used is less than 1 wt %, a uniform coating layer may not be formed, and thus, electrical conductivity may decrease. In the case in which the amount of the carbon precursor used is greater than 30 wt %, an additional irreversible reaction may occur, and thus, the capacity and initial efficiency may be decreased.

Also, the heat treatment, for example, may be performed in a temperature range of 300° C. to 1,400° C.

Also, the present invention may provide an anode active material including the porous composite.

The anode active material according to an embodiment of the present invention may further include a carbon-based material. That is, the porous material may be used by being mixed with a typically used carbon-based material.

The typically used carbon-based material may be one or more selected from the group consisting of natural graphite, artificial graphite, MCMB, carbon fibers, and carbon black.

Furthermore, the present invention provides a secondary battery including a cathode including a cathode active material; a separator; an anode including the anode active material; and an electrolyte.

Since the secondary battery according to an embodiment of the present invention may include an anode active material including the porous composite, the initial efficiency of the secondary battery may be improved.

For example, the anode may be prepared by coating an anode current collector with a mixture of an anode active material, a conductive agent, and a binder, and then drying the coated anode current collector. If necessary, a filler may be further added. The cathode may also be prepared by coating a cathode current collector with a cathode active material and drying the coated cathode current collector.

The separator is disposed between the cathode and the anode, and a thin insulating film having high ion permeability and mechanical strength may be used as the separator. Since the current collectors, electrode active materials, conductive agent, binder, filler, separator, electrolyte, and lithium salt are known in the art, the detailed descriptions thereof are omitted in the present specification.

The separator is disposed between the cathode and the anode to form a battery structure, the battery structure is wound or folded to put in a cylindrical battery case or prismatic battery case, and then a secondary battery is completed when the electrolyte is injected thereinto. Also, the battery structure is stacked in a bi-cell structure, impregnated with the electrolyte, and a secondary battery is then completed when the product thus obtained is put in a pouch and sealed.

Hereinafter, the present invention will be described in detail, according to specific examples. The invention may, however, be embodied in many different forms and should not be construed as being limited to the embodiments set forth herein.

Example 1

1-1. Preparation of $SiO_x$

Si having an average particle diameter of about 2 μm to about 5 μm and $SiO_2$ having an average particle diameter of about 2 μm to about 5 μm were mixed at a molar ratio of 70:30 to form a mixture. The mixture and stainless steel balls having a diameter of about 5 mm were mixed at a weight ratio of 1:15, and mechanical alloying was then performed at a rotational speed of about 1,000 rpm for 180 minutes by using a high-energy ball mill to prepare $SiO_x$. The preparation of the mixed composite was performed in an argon atmosphere and x of the $SiO_x$ was 0.6.

1-2. Electrodeposition of Ag on Surfaces of $SiO_x$ Particles 300 ml of a solution having 10% hydrogen fluoride (HF) and 300 ml of a solution having 10 mM silver nitrate ($AgNO_3$) were mixed for 10 minutes. 2 g of $SiO_x$ was added to the solution having hydrogen fluoride and silver nitrate mixed therein and the solution was mixed for 5 minutes, and then $SiO_x$ having Ag electrodeposited thereon was prepared by filtering, washing, and drying the mixture.

1-3. Chemical Etching 200 ml of a solution having 5% hydrogen fluoride and 100 ml of a solution having 1.5 wt % hydrogen peroxide ($H_2O_2$) added thereto were mixed for 10 minutes. $SiO_x$ having Ag particles electrodeposited thereon was added to the etching solution having hydrogen fluoride and hydrogen peroxide mixed therein and mixed for 30 minutes. Then, porous $SiO_x$ was prepared by filtering, washing, and drying the mixture.

1-4. Ag Removal 100 ml of 60% nitric acid ($HNO_3$) was heated to 50° C. and the porous $SiO_x$ was then added thereto and mixed for 2 hours. Porous $SiO_x$ for an anode active material having Ag removed therefrom was prepared by filtering, washing, and drying the mixture.

Example 2

$SiO_x$ was prepared in the same manner as in Example 1 except that Si and $SiO_2$ were mixed at a molar ratio of 50:50. In this case, x was 0.9.

Examples 3 and 4

Porous SiOx prepared in Examples 1 and 2 were respectively put in a rotary tube furnace and argon gas was introduced at a flow rate of 0.5 L/minute. Then, the temperature was increased to 1,000° C. at a heating rate of 5° C./minute. Porous $SiO_x$ coated with a conductive carbon material were prepared by performing a heat treatment for 3 hours while rotating the rotary tube furnace at a speed of 10 rpm and respectively flowing argon gas and acetylene gas at a rate of 1.8 L/minute and 0.3 L/minute. In this case, an amount of the conductive carbon material was 5 wt % of the porous $SiO_x$.

Examples 5 to 8

Preparation of Secondary Battery $SiO_x$ prepared in Examples 1 to 4 respectively as anode active materials, acetylene black as a conductive agent, and polyvinylidene fluoride as a binder were mixed at a weight ratio of 85:5:10 and the mixture was mixed with a N-methyl-2-pyrrolidone solvent to prepare a slurry. One surface of a copper current collector was coated with the prepared slurry to a thickness of 65 μm, dried and rolled. Then an anode was prepared by punching into a predetermined size.

$LiPF_6$ was added to a non-aqueous electrolyte solvent prepared by mixing ethylene carbonate and diethyl carbonate at a volume ratio of 30:70 to prepare a 1 M $LiPF_6$ non-aqueous electrolyte solution.

A lithium foil was used as a counter electrode, a polyolefin separator was disposed between both electrodes, and a coin-type secondary battery was then prepared by injecting the electrolyte solution.

Comparative Example 1

A secondary battery was prepared in the same manner as in Example 5 except that commercial silicon monoxide (SiO) was used as an anode active material.

Comparative Example 2

Commercial silicon monoxide was coated with a carbon material in the same manner as in Example 3, and a secondary battery was prepared in the same manner as in Example 5.

Comparative Example 3

Pores were formed in commercial silicon monoxide, the commercial silicon monoxide was then coated with a carbon material in the same manner as in Example 3, and a secondary battery was prepared in the same manner as in Example 5.

Comparative Example 4

$SiO_{0.6}$ was prepared in the same manner as in Example 1-1, and a secondary battery was prepared in the same manner as in Example 5 except that $SiO_{0.6}$ was used as an anode active material.

The following Table 1 represents porosities and BET specific surface areas of porous composites or $SiO_x$ prepared in Examples 1 to 4 and Comparative Examples 1 to 4.

TABLE 1

| Examples | Anode active material | Porosity (%) | BET specific surface area ($m^2/g$) |
| --- | --- | --- | --- |
| Example 1 | $SiO_{0.6}$ | 38 | 43.7 |
| Example 2 | $SiO_{0.9}$ | 38 | 43.7 |
| Example 3 | $SiO_{0.6}$/C | 38 | 43.7 |
| Example 4 | $SiO_{0.9}$/C | 38 | 43.7 |
| Comparative Example 1 | SiO | 0 | 2.3 |

TABLE 1-continued

| Examples | Anode active material | Porosity (%) | BET specific surface area ($m^2/g$) |
|---|---|---|---|
| Comparative Example 2 | SiO | 38 | 43.7 |
| Comparative Example 3 | SiO/C | 38 | 43.7 |
| Comparative Example 4 | $SiO_{0.6}$ | 0 | 2.3 |

Experimental Example 1

Scanning Electron Microscope (SEM) Analysis

Figure 2:
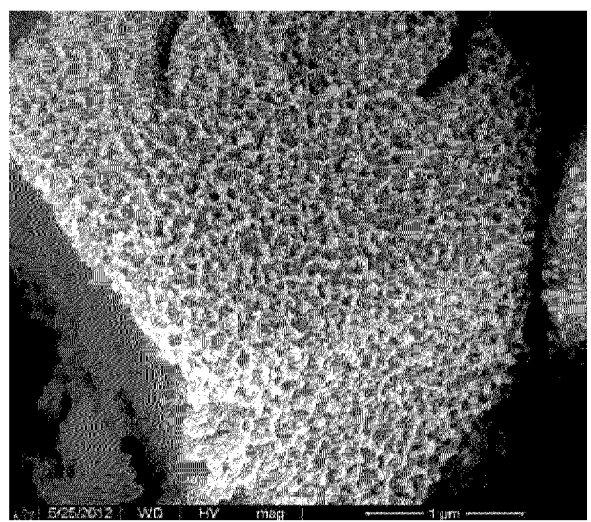
FIG. 2 is a scanning electron microscope (SEM) image of the porous composite according to the embodiment of the present invention.

SEM analysis was performed on a surface of the anode active material prepared in Example 1, and the results thereof are presented in FIG. 2.

As illustrated in FIG. 2, it may be understood that a plurality of pores were included on the surface or the surface and inside of the porous composite.

Experimental Example 2

Initial Efficiency, Lifetime Characteristics, and Thickness Change Rate Analysis The following experiments were performed in order to investigate initial efficiencies, lifetime characteristics, and thickness change rates of the secondary batteries prepared in Examples 5 to 8 and Comparative Examples 1 to 4.

First cycle charge capacity and first cycle discharge capacity were measured to obtain a ratio of the first cycle discharge capacity to the first cycle charge capacity for each battery.

Lifetime characteristics of each battery were measured by performing charge and discharge at 0.5 C after a third cycle and the lifetime characteristics were represented as a ratio of discharge capacity in a 49th cycle to the first cycle discharge capacity.

Each secondary battery was disassembled in a charge state of a 50th cycle and a thickness change rate was calculated by measuring difference in thicknesses of an electrode after the 50th cycle and before a charge cycle.

The following Table 2 presents initial efficiencies, lifetime characteristics, and thickness change rates of the secondary batteries prepared in Examples 5 to 8 and Comparative Examples 1 to 4.

TABLE 2

| Examples | Discharge capacity (mAh/g, discharged at 1.5 V) | Initial efficiency (%) | Lifetime characteristics (%) | Thickness change rate (%) |
|---|---|---|---|---|
| Example 5 | 1720 | 82.3 | 90 | 95 |
| Example 6 | 1650 | 74.5 | 93 | 85 |
| Example 7 | 1720 | 82.3 | 93 | 90 |
| Example 8 | 1650 | 74.5 | 96 | 80 |
| Comparative Example 1 | 1568 | 72 | 75 | 190 |
| Comparative Example 2 | 1568 | 72 | 85 | 120 |
| Comparative Example 3 | 1568 | 72 | 88 | 110 |
| Comparative Example 4 | 1720 | 82.3 | 70 | 200 |

Initial efficiency: (first cycle discharge capacity/first cycle charge capacity) × 100
Lifetime characteristics: (discharge capacity in a 49th cycle/first cycle discharge capacity) × 100
Thickness change rate: (electrode thickness after a 50th cycle − electrode thickness before a cycle)/electrode thickness before the cycle × 100

As illustrated in Table 2, it may be understood that the discharge capacities, initial efficiencies, and lifetime characteristics of the secondary batteries prepared in Examples 5 to 8 were improved in comparison to those of the secondary batteries prepared in Comparative Examples 1 to 4. It may be also understood that the thickness change rates of the secondary batteries prepared in Examples 5 to 8 were significantly lower than those of the secondary batteries prepared in Comparative Examples 1 to 4.

Specifically, the secondary batteries prepared in Examples 5 to 8, in which anode active materials including $SiO_x$ (where 0.5<x<1) were used, exhibited a discharge capacity of 1650 mAh/g or more, an initial efficiency of 74.5% or more, lifetime characteristics of 93% or more, and a thickness change rate of 95% or less. When compared with the secondary batteries prepared in Comparative Examples 1 to 4 in which anode active materials including $SiO_x$ (where x=1) were used, the differences in discharge capacities, initial efficiencies, lifetime characteristics, and thickness change rates were about 100 mAh/g, about 10% or more, 10% to 20% or more, and a maximum of about 100%, respectively.

Also, anode active materials having a molar ratio of oxygen of 0.6, i.e., $SiO_x$ (where x=0.6), were used in Example and Comparative Example 4. When Example 5 which used porous $SiO_x$ having a porosity of 38% was compared with Comparative Example 4 which used $SiO_x$ having a porosity of 0%, the discharge capacities and initial efficiencies were the same, but there were significant differences in their lifetime characteristics and thickness change rates. In particular, the thickness change rate of Example 5 was 95%, but Comparative Example 4 exhibited a thickness change rate of 200%.

The reason for this is that since the plurality of pores were included on the surface or the surface and inside of the porous composite and the porosity was in a range of 5% to 90%, the thickness change rate of the electrode generated during the charge and discharge of the secondary battery may be reduced, and as a result, the lifetime characteristics may be improved.

INDUSTRIAL APPLICABILITY

Since a porous composite of the present invention may increase an initial efficiency of a secondary battery, may decrease a thickness change rate of an electrode generated during charge and discharge, and may improve lifetime characteristics, the porous composite may be suitable for a secondary battery.

The invention claimed is:

1. A porous composite expressed by Chemical Formula 1 and having a porosity of 5% to 90%:

$$MO_x \quad \text{<Chemical Formula 1>}$$

where M is at least one element selected from the group consisting of silicon (Si), tin (Sn), aluminum (Al), antimony (Sb), bismuth (Bi), arsenic (As), germanium (Ge), lead (Pb), zinc (Zn), cadmium (Cd), indium (In), titanium (Ti), and gallium (Ga), and $0.5<x<1$, wherein the porous composite comprises (semi) metal particles and oxide particles of (semi) metal, wherein the (semi) metal particles are surrounded by the oxide particles of the (semi) metal, wherein pores are formed on a surface or the surface and inside of the porous composite and wherein the pores are a porous structure having a honeycomb shape.

2. The porous composite of claim 1, wherein a porosity of the porous composite is in a range of 20% to 80%.

3. The porous composite of claim 1, wherein x in Chemical Formula 1 is measured by an amount of oxygen that is included in a gas generated by heating the porous composite.

4. The porous composite of claim 1, wherein the porous composite comprises (semi) metal and oxide of the (semi) metal, wherein the (semi) metal is selected from the group consisting of Si, Sn, Al, Sb, Bi, As, Ge, Pb, Zn, Cd, In, Ti, Ga, and an alloy thereof.

5. The porous composite of claim 4, wherein the (semi) metal is Si, the (semi) metal oxide is $SiO_2$, and M is Si.

6. The porous composite of claim 4, wherein the (semi) metal and the (semi) metal oxide are in a form of nanocrystals.

7. The porous composite of claim 6, wherein a diameter of the nanocrystals is in a range of 0.1 nm to 100 nm.

8. The porous composite of claim 1, wherein a diameter of the pore on the surface of the porous composite is in a range of 10 nm to 1,000 nm.

9. The porous composite of claim 1, wherein a Brunauer-Emmett-Teller (BET) specific surface area of the porous composite is in a range of 2 $m^2/g$ to 100 $m^2/g$.

10. The porous composite of claim 1, further comprising a carbon coating layer on the porous composite.

11. An anode active material comprising the porous composite of claim 1.

12. An anode comprising the anode active material of claim 11.

13. A lithium secondary battery comprising the anode of claim 12.

* * * * *